Dec. 11, 1951     A. M. KROCZEK     2,578,309
TOOL GRINDING MACHINE
Filed July 7, 1947     4 Sheets-Sheet 1
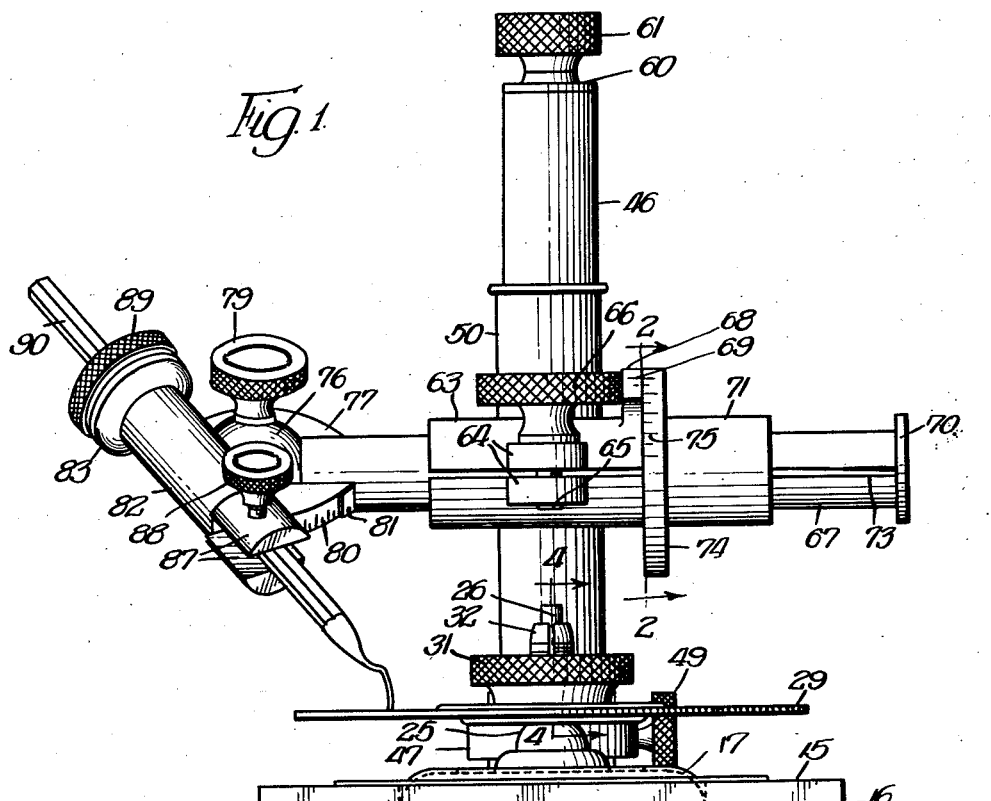
INVENTOR.
Anton M. Kroczek

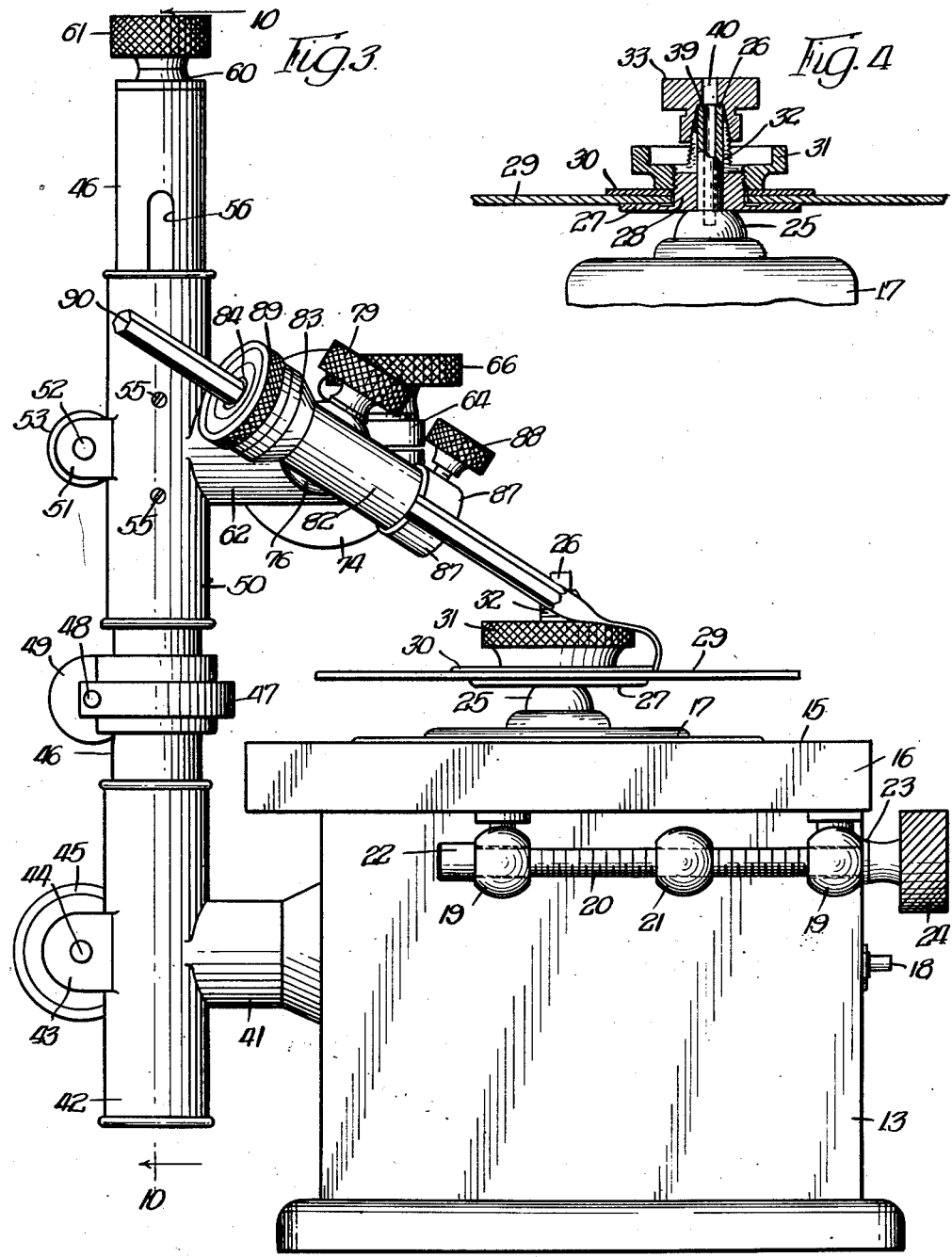

Dec. 11, 1951     A. M. KRÓCZEK     2,578,309
TOOL GRINDING MACHINE
Filed July 7, 1947     4 Sheets-Sheet 3
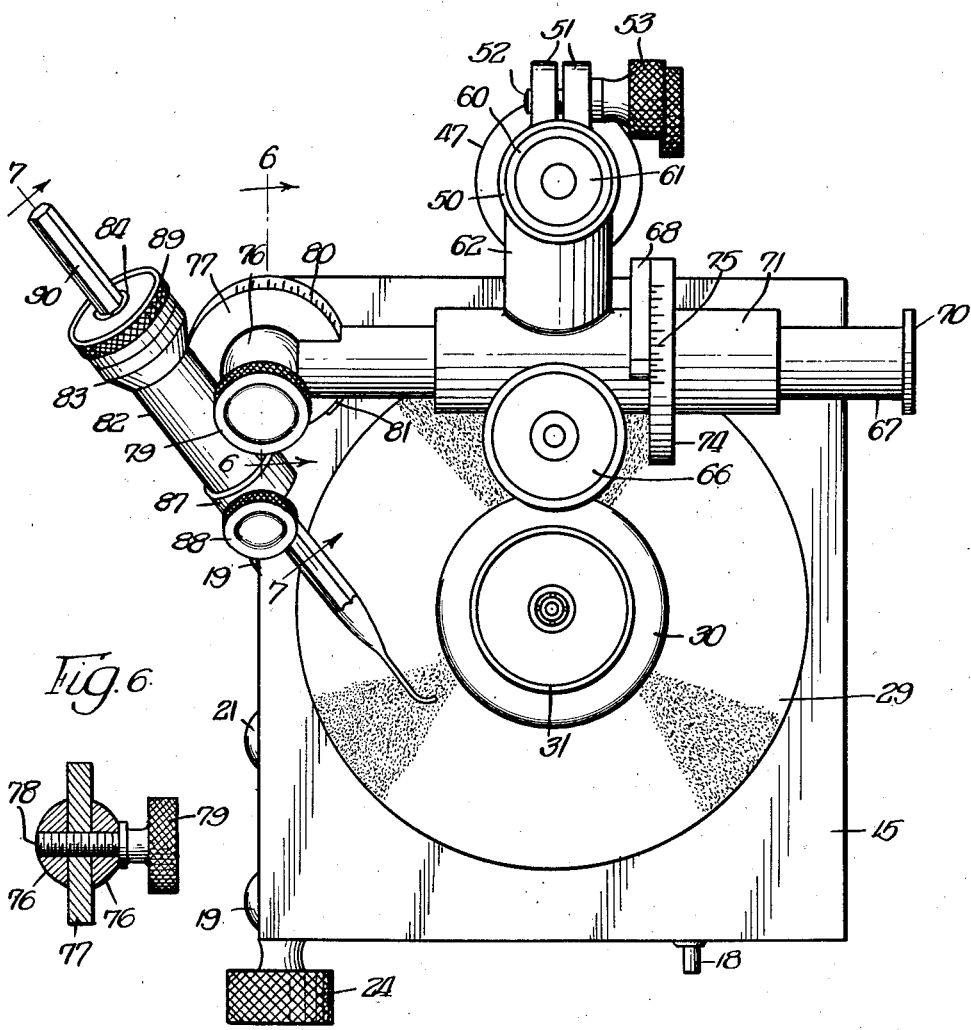
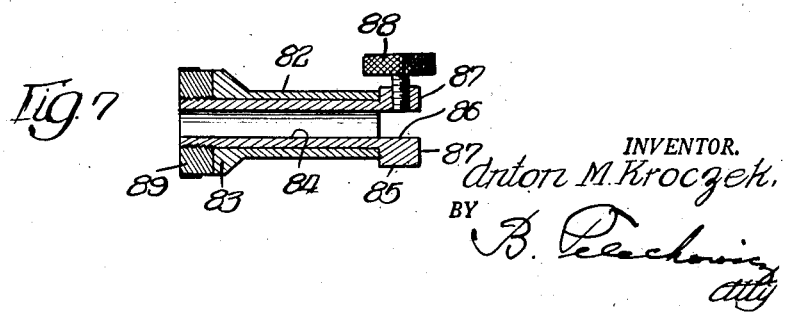
INVENTOR.
Anton M. Kroczek,
BY
B. Pelechowicz
atty

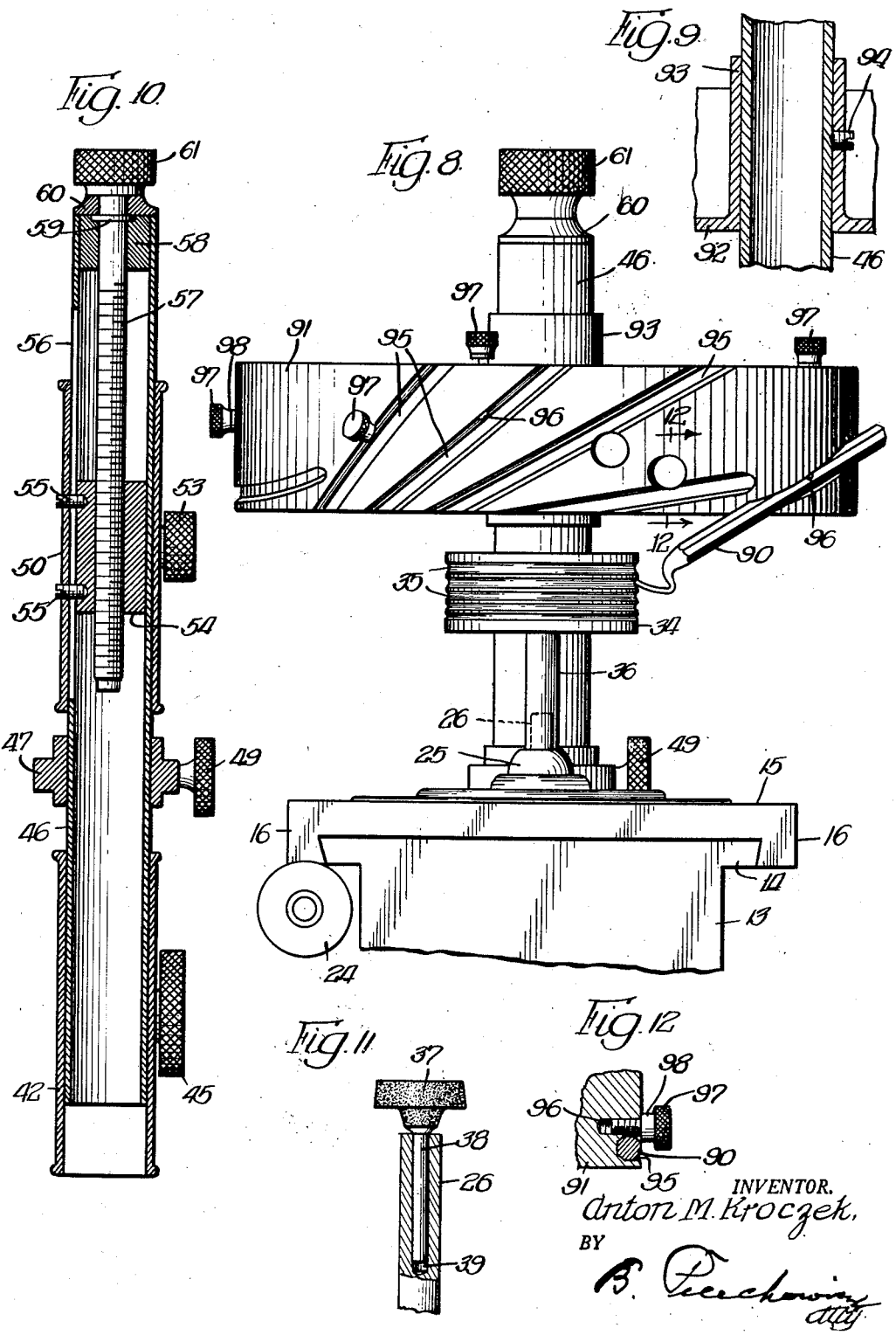

Patented Dec. 11, 1951

2,578,309

UNITED STATES PATENT OFFICE 2,578,309

TOOL GRINDING MACHINE

Anton M. Kroczek, Chicago, Ill.

Application July 7, 1947, Serial No. 759,343

2 Claims. (Cl. 51—125)

The present invention relates to the tool grinding machines and has for its main object the provision of a machine for grinding most delicate instruments such as dental or medical.

A still further object of the present invention is the provision in a tool grinding machine of a plurality of rougher and finer adjustments whereby a tool may be positioned at a predetermined and precise angle with relation to the grinding wheel.

A still further object of the present invention is the provision in a tool grinding machine of suitable markers or indicators in connection with the tool adjusting means for predetermining the exact angle at which a tool is held with relation to the grinding wheel for permitting duplication of grinding operation on a plurality of given tools in order to effect substantially identical operative ends in all of them.

Another object of the present invention is the provision in a tool grinding machine of effective means for shifting the grinding wheel support to or away from the tool support.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views;

Fig. 1 is a front elevational view of the present machine;

Fig. 2 is a cross-sectional view, taken on line 2—2 of Fig. 1;

Fig. 3 is a side elevational view of the present machine;

Fig. 4 is a vertical cross-sectional view through the grinding wheel supporting member, taken on line 4—4 of Fig. 1;

Fig. 5 is a top elevational view of the present machine;

Fig. 6 is a cross-sectional view on line 6—6 of Fig. 5;

Fig. 7 is a cross-sectional view on line 7—7 of Fig. 5;

Fig. 8 is a side elevational view, showing a tool supporting member and a grinding wheel, each of a modified construction;

Fig. 9 is a vertical cross-sectional view through the hub of the tool supporting member, illustrated in Fig. 8, in cooperation with a supporting post;

Fig. 10 is a vertical cross-sectional view through a post which supports a tool supporting member;

Fig. 11 shows a vertical cross-sectional view through a shaft cooperating with the grinding wheel supporting member, with a grinding wheel of a modified construction in an operative position therewith; and Fig. 12 is an enlarged fragmentary cross-sectional view on line 12—12 of Fig. 8.

Referring to the present drawings in detail there is shown therein a housing 13 having its upper end open, and provided at a pair of opposed side walls, and adjacent the upper ends thereof, with flanges 14, the outer faces of which are at an incline. Positioned upon the upper end of said housing 13 is carriage plate 15, provided at a pair of opposed edges with downwardly depending flanges 16, the inner walls of the latter being tapered for engaging the inclined faces of flanges 14, for preventing the disengagement of carriage plate 15 from housing 13 in a vertical direction, but for permitting sliding movement of said carriage plate 15 transversely of housing 13 and in a longitudinal direction with relation to flanges 14.

Rigidly affixed by its upper end to carriage plate 15, and partially extending therefrom, is electric motor 17, the body portion of which downwardly depends from said carriage plate 15 and is enclosed within housing 13. Electric wires (not shown) lead from said motor 17 to switch 18, the latter mounted within the front wall of the housing, by means of which said motor 17 may be set in operation or stopped.

Rigidly affixed to one flange 16, and downwardly depending therefrom is a pair of bearings 19, within which threaded shaft 20 is supported for free movement therewithin. Another bearing 21, mounted upon the adjacent side wall of housing 13, is positioned intermediately of said bearings 19. Said bearing 21 is in a threaded engagement with shaft 20. Said shaft 20, at its rear end is provided with a stop 22 threaded on one end of shaft 20 for engagement with the adjacent bearing 19. Shoulder 23, adjacent the front end of shaft 20 provides another stop which is in contact with the other bearing 19. The front end of said shaft 20 is provided with an integrally formed knurled knob 24, by means of which said shaft 20 may be rotated.

Due to the rigid longitudinal connection of shaft 20 with bearings 19, by means of stops 22 and 23, and by virtue of threaded connection thereof with bearing 21, on rotation of said shaft 20 carriage plate 15 is caused to shift in one or an opposite direction, depending on the direction to which shaft 20 has been rotated by means of knob 24.

Integrally formed with the housing of motor 17 is an upwardly projecting stud 25, through which shaft 26 projects, and which shaft is driven by motor 17. Supportable upon said stud 25 is an annular plate 27, from which a concentric boss 28 upwardly projects, both said plate 27 and boss 28 are insertable over said shaft 26 in a concentric relation. Grinding wheel 29, made of an abrasive material is insertable over said boss 28 and rests upon plate 27, by which the former is supported. Clamping plate 30 is placed over said grinding wheel 29, for maintaining the same in a clamped position between plates 27 and 30. The upper end of boss 28 is threaded for receiving in a threaded engagement knob 31, by means of which plates 27 and 30, with grinding wheel 29 interposed therebetween, are maintained in a mutually clamped relation.

Integrally formed with boss 28, and upwardly projecting therefrom is chuck 32, which is of a reduced diameter, and which includes a plurality of outwardly threaded tapering tines, through which shaft 26 extends. Screw 33 threadedly engages chuck 32 and compresses the tines thereof toward shaft 26 for effecting a strong frictional engagement between chuck 32 and said shaft 26, for rigidly engaging grinding wheel 29 with said shaft 26. By virtue of this arrangement when shaft 26 rotates the grinding wheel 29 rotates therewith.

A modified form of grinding wheel is illustrated in Fig. 8, and which consists of a cylindrical block 34, is provided on its periphery with a plurality of grooves 35, within any one of which the end of a tool may be inserted for grinding. Of course said block 34 is made of an abrasive material. In a concentric relation with said block 34 is a hollow shaft 36 within which motor shaft 26 is frictionally held. When the wheel of the type shown in Fig. 8 is used, the wheel illustrated in Figs. 3, 4 and 5 may be removed from shaft 26.

A modified grinding wheel 37 is shown in Fig. 11. The same is of a comparatively small diameter, and has shaft 38 insertable within motor shaft 26, the latter being provided with a concentric bore 39 to receive said shaft 38. Screw 33 is provided with a corresponding bore 40 through which said shaft 38 may be inserted, and said grinding wheel 37 may be optionally used while wheel 29 is in an operative position upon shaft 26 or removed therefrom.

Rigidly affixed to the rear wall of housing 13 is bracket 41, which supports in a vertical direction split sleeve 42, which has a pair of rearwardly extending arms 43, one on each side of the split for receiving in a threaded engagement screw 44, operable by knob 45, for the purpose of tightening or loosening arms 43, and thereby of disengageably supporting hollow, cylindrical post 46, the latter receivable within said sleeve 42 for vertical adjustment.

Inserted upon post 46 is split collar 47, which may be vertically adjusted upon post 46 by means of engaging screw 48 and its operable knob 49. Said collar 47, when rigidly affixed to post 46 by means of screw 48, constitute means for limiting the downward shifting movement of said post 46 within sleeve 42, and thereby predetermining the downward shifting movement of tool adjusting and supporting elements hereinafter described.

Set upon post 46 for sliding movement thereon is collar 50 which is split intermediately of a pair of laterally extending arms 51 for reception of screw 52 operable by means of knob 53, whereby the frictional pressure of said collar 50 on post 46 may be regulated. Positioned within post 46 (see Fig. 10) is piston 54 for free vertical sliding movement therewithin. A pair of screws 55, passed through longitudinal slot 56 made in post 46, and rigidly engaging collar 50 and piston 54 connect the two. Positioned in a coaxial relation with post 46 is screw 57, which is passed through a threaded bore in piston 54 for threadedly engaging the latter. In frictional engagement with the upper end of post 46 is stopper 58 through which said screw 57 passes, the portion of the screw within said stopper 58 being smooth and not threaded for permitting free rotary movement of the former within the latter. Screw 57 is provided with an integrally formed or rigidly attached flange 59 which is countersunk within the upper end of stopper 58. Apertured cap 60, welded or soldered to the upper end of post 46 overlies the upper end of stopper 58 and flange 59. Screw 57 passes through said cap 60. Flange 59, being interposed between stopper 58 and cap 60, prevents longitudinal movement of screw 57 with relation to post 46. Knob 61, rigidly engaging the upper end of screw 57, constitutes means whereby screw 57 may be rotated in either direction. By virtue of this construction, on rotation of screw 57 collar 50 will be caused to shift vertically upon post 46 as piston 54 is actuated by screw 57, screws 55 being within slot 56 permit upright sliding movement of collar 50, but prevent rotary movement thereof upon post 46.

Rigidly affixed to collar 50 is bracket 62, laterally extending from said collar 50 and in a parallel relation with bracket 41. Affixed to the outer end of said bracket 62 is split sleeve 63, which is in a horizontal position and overhangs carriage plate 15. Adjacent its split said sleeve 63 is provided with a pair of arms 64 receiving screw 65 operable by knob 66. Receivable within said sleeve 63 is rod 67, which is longitudinally slidable within sleeve 63 on loosening screw 65 by operation of knob 66. The upper portion of sleeve 63, adjacent one end thereof, is provided with an arcuate flange 68, the end face whereof is provided with marker 69. One end of said rod 67 is provided with a disengageable flange 70, which, when disengaged, permits insertion upon said rod 67 of cylindrical member 71. Said cylindrical member 71 on its inner periphery is provided with tooth 72 which enters key way 73 made in said rod 67 in its end adjacent flange 70. The inner end of said cylindrical member 71 has an integrally formed flange 74 with a plurality of lines 75 made on its face for indicating the degrees of rotation to which said cylindrical member 71 and rod 67 have been subjected.

From the hereinabove description it will be seen that rod 67 may be longitudinally adjusted within sleeve 63. When said rod 67 is shifted in the direction which causes the approach of flange 70 towards said sleeve 71, tooth 72 rides within key way 73 thereby preventing the transverse dislocation of cylindrical member 71 with relation to rod 67. When however rod 67 is rotatably adjusted, cylindrical member 71 with flange 74 bodily rotates with said rod 67, the lines 75 with reference to marker 69 provide means for reading the degrees of rotation of said rod 67 in either direction.

The opposite end of rod 67 is provided with a pair of opposed bulges 76 (see Fig. 6) with a recess therebetween made longitudinally of said rod 67, for receiving therewithin wheel 77. Screw 78, operable by knob 79, passes through said wheel 77, and by virtue of its threaded engagement with the bulge adjacent the free end of said screw clamps said wheel 77 between said bulges 76, for the purpose of maintaining said wheel 77 in its rotatably adjusted position within said rod 67. The periphery of said wheel 77 is provided with a plurality of lines 80 for indicating the degrees to which said wheel 77 has been rotatably adjusted. Lip 81, laterally extending from rod 67, at the base of the recess within which wheel 77 is positioned, provides a marker for facilitating reading the degrees as lines 80 come in register with the free end of said lip 81. Said lip 81 has an arcuate formation corresponding to the peripheral arc of wheel 77, thereby permitting said lip 81 to ride upon the periphery of said wheel 77 as the same is turned.

Rigidly affixed to said wheel 77 at a point adjacent its periphery is sleeve 82, provided at one of its ends with shoulder 83. Receivable within said sleeve 82 is tubular member 84, one end of which has an outwardly extended flange 85. Said end of said member 84 is recessed as at 86 for defining a pair of clamping jaws 87, one of which is engaged by screw 88. Flange 85 provides a shoulder which limits further shifting movement of sleeve 82 upon tubular member 84.

The outer end of said tubular member 84 extends beyond the outer termination of said sleeve 82, and beyond shoulder 83, and is threaded for being threadedly engaged by outwardly knurled ring 89. By virtue of this construction said tubular member 84 is rigidly affixed to said sleeve 82, so that the entire assembly may be angularly shifted as said wheel 77 is turned. With it shifts tool 90 receivable within tubular member 84. Said tool may be longitudinally adjusted and clamped within jaws 87 when screw 88 is tightened thereagainst.

From the hereinabove description it will be readily seen that the tool supporting elements, including rod 67 and sleeve 82 may be vertically adjusted toward or away from grinding wheel 29 or 37, as the case may be by rotating screw 57 for shifting collar 50 upon post 46. The angular adjustment of tool 90 transversely of rod 67 is effected by turning said rod 67 into one or the opposite direction on loosening frictional engagement therewith of sleeve 63 when screw 65 is released by turning knob 66. The angular adjustment of tool 90 in a longitudinal direction with relation to rod 67, or on a plane which is substantially at ninety degrees with relation to the plane of movement of said tool 90 last hereinabove mentioned, is effected by turning sleeve 82 with rotary shifting movement of wheel 77 when screw 78 is turned by operating knob 79. The extent of rotary shifting of rod 67 is indicated by marker 69 in cooperation with degree lines 75, while the extent of angular adjustment of sleeve 82 is indicated by the extent of rotary shifting movement of wheel 77 as read by degree lines 88 coming in register with the free end of lip 81. By virtue of this arrangement the grinding by wheel 29 or 37 upon one tool may be duplicated upon the others by setting rod 67 at a predetermined angle of rotation as measured by degree lines 75 and marker 69, and at a predetermined angle of rotation of wheel 77 as measured by degree lines 80 in cooperation with lip 81.

The modified form of a tool supporting element is illustrated in Fig. 8. There is shown therein wheel 91 with a plurality of radial arms 92 connecting said wheel 91 with hub 93. The latter is set upon post 46 for upright sliding movement thereon. Screw 94 passing said hub 93 engages post 46 for rigid adjustment of said wheel 91 upon said post 46. The use of the modified form of tool supporting element contemplates removal of collar 50 together with the tool supporting element heretofore described.

The above operation is readily accomplished by simply removing screws 55 from piston 54 and collar 50. Thereupon said collar 50 is removed from post 46 by sliding the same in an upward direction. Wheel 91 is substituted by sliding hub 93 over knob 61 and unto post 46.

Wheel 91 on its outer periphery is provided with a plurality of recesses 95 which are in an oblique relation with the longitudinal axis of wheel 91 and at various angular positions with relation thereto. Preferably each recess 95 on transverse cross section corresponds to the transverse contour of the shank of the tool in order that the latter may snugly fit into the recess. Each recess 95 is open along the outer periphery of wheel 91 in order that tool 90 may be bodily received within the recess as the tool is brought towards the wheel's periphery and in a longitudinal relation with the recess into which the shank of the tool is to be inserted. Cooperating with each recess is screw 96 having knob 97 and a shoulder 98 at the inner end of knob 97. Some of said screws 96 may be optionally driven transversely of wheel 91, while others may be set upon the end of said wheel 91 and driven thereinto in a longitudinal direction therewith, as is seen in Fig. 8. Those screws 96 which are positioned in a transverse direction with relation to wheel 91 are in the nearest proximity with their cooperating recesses, in fact the body of the screw skirts one of the horizontal transverse wall of recess 95. By virtue of this arrangement, when the shank of tool 90 is within recess 95, shoulder 98 contacts and bears against the exposed portion of the body thereof for clamping the tool within wheel 91, as is clearly seen in Fig. 12.

Those screws 96 which cooperate with wheel 91 longitudinally thereof have prolonged body portions to enter recess 95 from above and in a longitudinal relation with wheel 91 for bearing against the tool by their ends as they enter recesses 95.

By virtue of a definite angular position of tool 90 within any chosen recess 95, the grinding operation upon the end of one tool may be duplicated upon others by inserting the latter within a recess in which the first tool was positioned. Of course, tool 90 may be longitudinally shifted within any given recess 95 to bring the same towards or away from the grinding wheel. Optionally recesses 95 need not extend fully throughout the entire width of wheel 91, but may terminate short of one end of wheel 91, and one such recess 95 is shown in Fig. 8.

Since wheels 29, 34 and 37 are interchangeable with shaft 26, tool supporting wheel 91 may be used in connection with any selected grinding wheel, not necessarily with wheel 34 as shown in Fig. 8. This holds also true in connection with the tool supporting and adjusting element illustrated in Figs. 1, 3 and 5.

Since carriage plate 15 is shiftable to or away from post 46, the grinding wheel carried thereby is brought to the most effective position with relation to the end of the tool to be ground. This holds particularly true with respect to wheel 34, in which grooves 35 are at the periphery of the wheel. If for instance the point of the tool is set in one of said grooves 35 at a point upon the periphery of wheel 34 which is farthest removed from post 46, and then carriage plate 15 is shifted away from said post 46 by turning screw 20 into a proper direction, varied degrees of pressure by wheel 34 may be exerted upon the contacting end of the tool to impart thereto the most effective, desired and predetermined grinding operation.

Obviously, plate 27 need not be in contact or supported by stud 25. Boss 28 and chuck 32 may be adjusted vertically upon shaft 26 and affixed to said shaft at any adjusted position. This will permit bringing of the grinding wheel 29 to or away from the tool in a vertical direction.

If preferred, cap 60 may not be in a rigid engagement with post 46. The same may be soldered or welded to stopper 58. The latter however should be in a frictional engagement with said post 46, or affixed thereto by a screw. In that latter construction piston 54, screw 57, stopper 58, cap 60 and knob 61 may all be removed from post 46 after the removal therefrom of collar 59, and preliminarily to the insertion upon said post 46 of hub 93 and wheel 91.

From the hereinabove description it will also be seen that collar 47 being adjustable on post 46, constitutes thereby a means for predetermining the downward shifting movement of post 46, with all tool carrying and adjusting appurtenances supported thereby, said collar 47 coming in contact with the uper end of sleeve 42 preventing further downward shifting movement of post 46. This arrangement constitutes a means for predetermining the extent of grinding operation of wheel 29 upon the end of tool 90. For example let us suppose that collar 47 was so set upon post 46 as to create a gap therebetween and the upper end of sleeve 42 of one-eighth inch in width, while the end of the tool is already in contact with grinding wheel 29. In this given example it is possible for grinding wheel 29 to grind off one-eighth of an inch in the end of the tool, because when grinding to that extent has already taken place, at that very instance collar 47 will be in contact with the upper end of sleeve 42, thereby preventing further downward shifting movement of post 46, the appurtenances carried thereby and the tool.

Likewise wheel 91 is adjustable vertically upon post 46 by means of hub 93 and screw 94, for bringing wheel 91 and with it tool 90 to or away from the grinding wheel.

In the precision tools and instruments, such as surgical or dental, the edges at the operative end of the tool must be at certain definite angles with relation to the axis of the tool or relative to each other. Thus, various adjustments in the machine are capable of grinding the tool at any predetermined angle either while grinding a new tool or regrinding an old one. Angular adjustments of the tool along several planes, as well as the means for limiting the downward shifting movement of the tool towards the grinding wheel, are capable of work of great precision.

It should also be noted that after adjusting collar 47 to a predetermined distance from sleeve 42, piston 54 may then be brought down to shift tool supporting and adjusting elements until the end of the tool comes in contact with the grinding wheel.

Rod 67 being longitudinally shiftable within sleeve 63 permits adjustment of the tool on a horizontal plane and transversely of the grinding wheel, thereby permitting setting of the operative point of the tool to be ground nearer or farther away from the center of the grinding wheel. As the grinding operation progresses flange 74 may be manually grasped and rotatably shifted against the frictional hold of sleeve 63 for shifting rod 67 during the progress of the grinding operation upon the tool, simultaneously noting the degrees of the shift of rod 67 on reference to lines 75 and marker 69.

As an alternative mode of the operation of rod 67, sleeve 63 may be rendered loose upon rod 67 by loosening screw 65 on turning knob 66, with the operative end of tool 90 upon grinding wheel 29 while the grinding operation proceeds. During the progress of the grinding operation, visual observation alone of marker 69 and the shifting of degree indicating lines 75 therealong will appraise of the sufficiency of the grinding, at which time motor 17 may be stopped on operating switch 18, without the need of manipulating the tool supporting parts while the grinding operation proceeds.

While there is described herein a preferred embodiment of the present invention, it is nevertheless to be understood that minor changes may be made therein without departing from the spirit and scope of the invention as claimed.

What I claim as new :

1. In a tool grinding machine including a base, a power driven grinding wheel mounted on said base and having its grinding surface disposed substantially in a horizontal plane, a support rigidly secured to said base and projecting vertically therefrom, means connected between said base and said grinding wheel for moving said grinding wheel linearly toward or away from said support, a substantially hollow sleeve mounted on said support and extending transversely thereof, a rod having a recess extending inwardly from one of its ends forming a pair of opposed jaws, a substantially circular disk having indicia on the periphery thereof, a tool carrying member rigidly secured to said disk, said rod having an extension projecting therefrom toward the periphery of said disk to form indicating means cooperating with said indicia, means extending between said jaws and coacting therewith to clamp said disk in its adjusted position, said rod being slidably and rotatably mounted within said sleeve, a pointer rigidly secured to said sleeve, and an indicia bearing flange connected with said rod for rotation therewith about its longitudinal axis and for movement in the direction of its longitudinal axis, said flange cooperating with said pointer to indicate the degree of rotation of said rod as said grinding wheel operates on a tool supported by said rod.

2. In a tool grinding machine including a base, a power driven grinding wheel mounted on said base and having its grinding surface lying substantially in a horizontal plane, a plurality of telescoping sleeves mounted on said base and projecting vertically therefrom, means maintaining the telescoping sleeves in an adjusted position, means connected between said base and said grinding wheel for moving said grinding wheel in a linear direction toward or away from said telescoping sleeves, an elongated substantially cylindrical member mounted on said support and extending transversely thereof, a tool carrying rod positioned within said member for rotation about its longitudinal axis and for movement in the direction of its longitudinal axis, a pointer rigidly secured to said sleeve, and an indicia bearing flange keyed to said rod for rotation therewith about its longitudinal axis and for reciprocal sliding movement in the direction of its longitudinal axis, said flange cooperating with said pointer to indicate the degree of rotation of said rod as said grinding wheel operates on a tool supported by said rod.

ANTON M. KROCZEK.

REFERENCES CITED

The following references are of record in the file of this patent:

UNITED STATES PATENTS

| Number | Name | Date |
|---|---|---|
| 201,449 | Rider | Mar. 19, 1878 |
| 479,452 | Passmore | July 26, 1892 |
| 523,504 | Armeny | July 24, 1894 |
| 753,992 | Marcher | Mar. 8, 1904 |
| 765,800 | Stansfield | July 26, 1904 |
| 802,368 | Coleman | Oct. 24, 1905 |
| 921,986 | Hanson | May 18, 1909 |
| 1,075,321 | Baldwin | Oct. 14, 1913 |
| 1,350,951 | Artmaier | Aug. 24, 1920 |
| 1,636,671 | Anzelwitz | July 19, 1927 |
| 1,920,073 | Gorton | July 25, 1933 |
| 1,958,021 | Schmidt | May 8, 1934 |
| 2,024,268 | Bausch et al. | Dec. 17, 1935 |
| 2,052,981 | Kuhle | Sept. 1, 1936 |
| 2,304,530 | Bigelow | Dec. 8, 1942 |
| 2,328,650 | Johnson et al. | Sept. 7, 1943 |
| 2,544,097 | Lentz | Mar. 6, 1951 |